United States Patent [19]

Potts

[11] 4,415,139

[45] Nov. 15, 1983

[54] AUTOMATIC SLIDING GATE VALVE

[75] Inventor: P. Keith Potts, Kingsport, Tenn.

[73] Assignee: Eastman Kodak Company, Rochester, N.Y.

[21] Appl. No.: 289,349

[22] Filed: Aug. 3, 1981

[51] Int. Cl.³ .............................................. F16K 25/00
[52] U.S. Cl. ..................................... 251/62; 251/159; 251/172; 251/329; 251/328
[58] Field of Search .................. 251/172, 159, 62, 328, 251/329

[56] References Cited

U.S. PATENT DOCUMENTS 4,292,992 10/1981 Bhide' ............................. 251/172 X
4,335,733 6/1982 Richards ......................... 251/172 X Primary Examiner—Arnold Rosenthal
Attorney, Agent, or Firm—Malcolm G. Dunn; Daniel B. Reece, III

[57] ABSTRACT

An automatic sliding gate valve for connection to the ingress or egress opening of a vibrating dryer or other structure operable under either vacuum or pressure, the gate valve having a flat slide plate slidably movable by fluid powered cylinders and dampened, held rigid in its guides and held against pressure or vacuum by pneumatic seal members.

2 Claims, 3 Drawing Figures

AUTOMATIC SLIDING GATE VALVE

TECHNICAL FIELD

The present invention is directed to an automatic sliding gate valve adapted to be connected to the ingress or egress opening of a vibrating dryer or other structure operable under either vacuum or pressure.

When using a vibrating dryer, for instance, to dry pellets of man-made polymeric material, the conduits used to connect to the dryer inlets or outlets are isolated from the vibration of the dryer somewhat by the use of a flexible boot connected at one end to the vibrating dryer and at the other end to the conduit. In converting the vibrating dryer operation to one requiring vacuum or pressure, if the boot should be strong enough to resist the vacuum or pressure and heat it may be too rigid to withstand the vibration and thus is soon torn. If the flexible boot is sufficiently flexible to withstand vibrations, it may not withstand the heat, and may also collapse under vacuum or pressure.

An object of the invention, therefore, is to provide and interpose a sliding gate valve between the flexible boot and the vibrating dryer or other structure operable under vacuum or pressure, thus connecting the sliding gate valve directly to the ingress or egress opening of such structure and thereby isolating the flexible boot from vacuum or pressure.

Since pelleted or other forms of comminuted materials will be flowing to the dryer or other structure operable under vacuum or pressure, a structure such as a sliding gate valve interposed between such dryer or other structure must be essentially free from becoming jammed by the pellets or comminuted material as they pass therethrough so that the sliding portion of the sliding gate valve will operate with little or no attention from an operator.

Another object of the invention, therefore, is to provide a sliding gate valve the mechanism of which will be essentially free from jamming or clogging by pelleted or comminuted materials.

Still another object is to provide a sliding gate valve that will be capable of withstanding vibration, heat and vacuum or pressure.

A further object of the invention is to provide a sliding gate valve that may be automatically operated from a remote distance.

Other objects inherent in the nature of the invention will become apparent from the description that follows.

DISCLOSURE OF THE INVENTION

In accordance with the present invention, I provide an automatic sliding gate valve adapted to be connected to the ingress or egress opening of a vibrating dryer or other structure that is operable under either vacuum or pressure. The sliding gate valve has a pair of parallelly spaced apart sidewalls, and a pair of outer plate members connected in spaced apart parallel relation at right angles to and by the pair of parallelly spaced apart sidewalls. Each outer plate member defines therethrough an opening of predetermined size in coaxial alignment and coalignment with the opening through the other outer plate member and is adapted to be in coaxial alignment with the ingress or egress opening of the dryer or other structure when the gate valve is connected thereto.

The gate valve also has a flat slide plate member while the pair of parallelly spaced apart sidewalls have opposed slotted guide rails adapted to slidably receive therebetween the opposite side edges of the flat slide plate member. The flat slide plate member defines therethrough adjacent one end thereof an opening of predetermined size adapted to be in coaxial alignment with the outer plate member openings when the opening in the flat plate member is slidably moved thereto.

The gate valve has pneumatic seal members bordering each of the outer plate member openings on the side of each of the outer plate members that is adjacent to one of the flat surfaces of the flat slide plate member. The pneumatic seal members are adapted when expanded to provide an airtight seal between each of the outer plate members and the adjacent flat surfaces of the flat slide plate member and around each of the outer plate member openings. A suitable structure may be provided to expand and contract the pneumatic seal members.

A suitable operating structure may also be provided for connection to the flat slide plate member and adapted to slidably move the flat slide plate member along the opposed slotted guide rails until the opening in the flat plate slide member is in coaxial alignment with the outer plate member openings or the flat surface of the flat slide plate member extends over the outer plate member openings.

The opposite end portions of each outer plate member along the length thereof extend an equal distance from the axis of the opening in the outer plate member, and the flat slide plate member is supported and confined along its entire length for movement within the opposed slotted guide rails.

The aforementioned suitable operating structure connected to the flat slide plate member for slidably moving it in one direction or the other may comprise a pair of fluid powered cylinders, each being operably connected adjacent one of the opposite side edges of the flat slide plate member on one side thereof.

Each outer plate member of the sliding gate valve defines through its aforementioned opposite end portions along the length of the outer plate member a plurality of longitudinally extending slots each parallel to the other. Each fluid powered cylinder is secured to the outer surface of one of the outer plate members and has a connection extending from one end of the fluid powered cylinder and through one of the aforementioned longitudinally extending slots for operable connection to the flat slide plate member.

BRIEF DESCRIPTION OF DRAWINGS

The details of my invention will be described in connection with the accompanying drawings, in which.

BEST MODE FOR CARRYING OUT THE INVENTION

Figure 1:
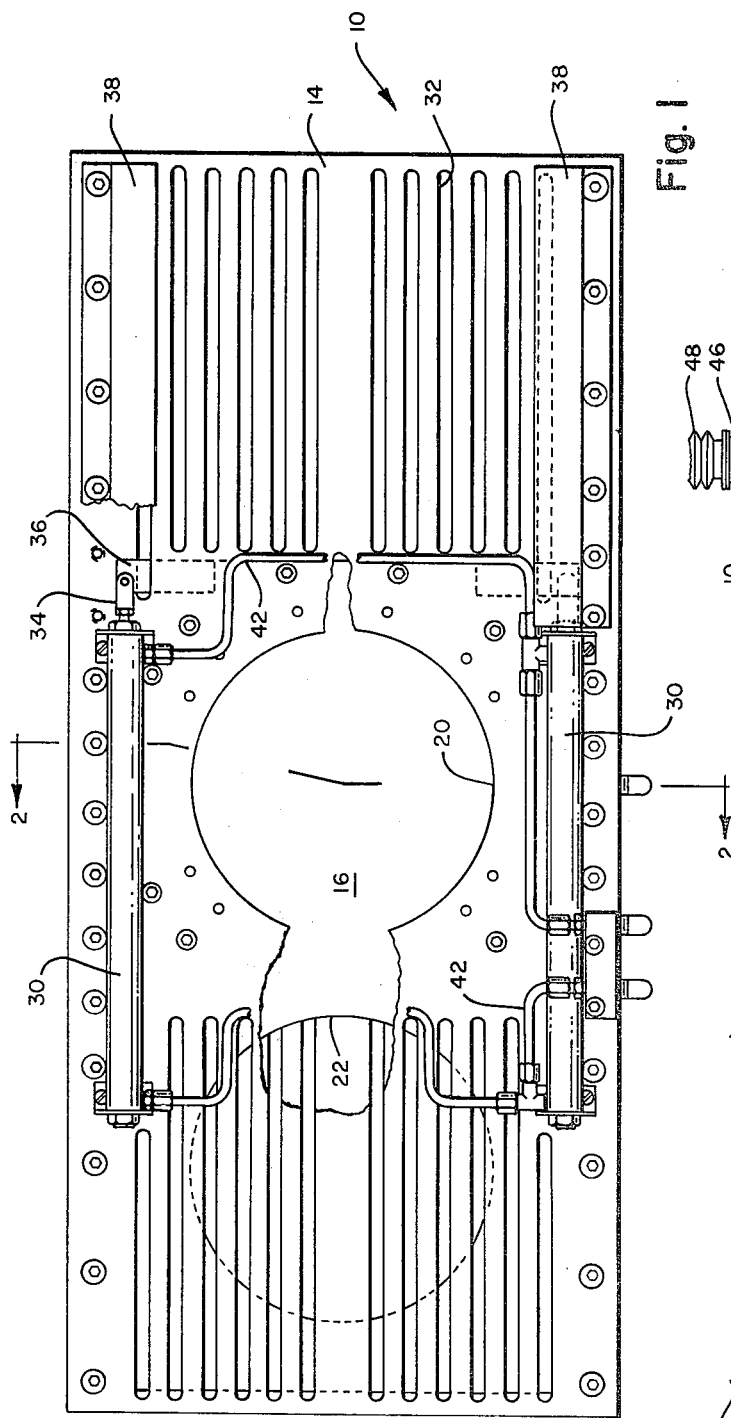
FIG. 1 is a plan view of the automatic sliding gate valve partially broken away to illustrate the flat slide plate member and its opening.

In reference to the drawings, the automatic sliding gate valve is shown at 10 and includes a pair of sidewalls 12, which are spaced apart from each other in parallel relation; and a pair of outer plate members 14 connected in spaced apart parallel relation at right angles to and by the sidewalls 12; and a flat slide plate member 16. The sidewalls 12 each have a slotted guide rail 18, which faces the other slotted guide rail in opposed relation and which is adapted to slidably receive one of the opposite side edges of the flat slide plate member 16.

Each of the outer plate members 14 defines therethrough an opening 20 of predetermined size, the opening being not only in coaxial alignment but also in coalignment with the opening through the other outer plate member, i.e., the openings 20 are of the same size and configuration and are adapted to be in coaxial alignment with the ingress or egress opening of a dryer or other structure when the gate valve is connected thereto.

The flat slide plate member 16 defines therethrough adjacent one end thereof an opening 22 which is of predetermined size and is adapted to be coaxially aligned with the outer plate member openings 20 when the flat slide plate member is slidably moved so that the opening 22 becomes in coaxial alignment with the openings 20. When opening 22 is not in such coaxial alignment with the outer plate openings 20, the flat surface of the flat slide plate extends across the openings 20, as shown in FIG. 1.

Pneumatic seal members 24 border each of the outer plate member openings 14 on the side of each of the outer plate members that is adjacent to one of the flat surfaces of the flat slide plate member 16.

Figure 2:
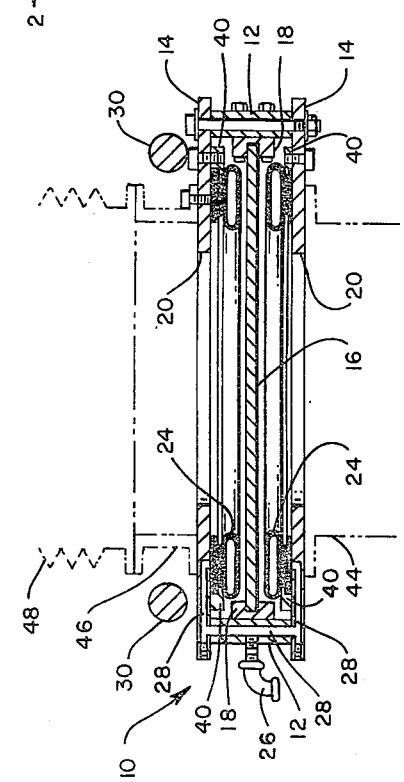
FIG. 2 is an elevational view in cross-section of the automatic sliding gate valve taken along line 2—2 of FIG. 1 and illustrates in phantom line in part the representative flanges or flexible boot to which it may connect.

The pneumatic seal members are inflatable or expandable, as well as contractable or deflatable, as through an air conduit 26, and air passages 28 as shown in FIG. 2, and may preferably be of donut-like or torous configuration as illustrated and which are made by Presray, Designers and Manufacturers of Pneumatic Handling and Sealing Systems, a subsidiary of Pawling Rubber Corporation, Pawling, New York. When inflated or expanded, the pneumatic seal members are adapted to provide an airtight seal between each of the outer plate members 14 and the adjacent flat surfaces of the flat slide plate member 16, and around each of the outer plate member openings 20, and also around the flat slide plate member opening 22 when the latter is coaxially aligned with the outer plate member opening.

A pair of fluid powered cylinders 30, preferably air cylinders, is secured to the outer surface of one of the outer plate members 14 and are operably connected to the flat slide plate 16 to slidably move it. Each outer plate member also has defined through its opposite end portions along the length thereof a plurality of longitudinally extending slots 32, each slot being parallel to the others. Each fluid powered cylinder 30 has a clevis connection 34 which is pinned to a bracket 36 which extends through one of the longitudinally extending slots 32 for connection to the flat slide plate member 16. A guard 38 may be provided over the extended cylinder rods (not shown) and the slots 32 in which the cylinder rod, clevis connection and bracket move.

The opposite end portions of and along the length of each outer plate member extend an equal distance from the axis of the opening 20 in the outer plate member. In this manner the flat slide plate member is supported and confined along its entire length for sliding movement in either direction within the opposed slotted guide rails 18 without any terminal end portions extending beyond the outer plate members and being unduly vibrated.

The pneumatic seal members 24 are secured to the outer plate members by annular retaining rings 40 which are in turn bolted to the outer plate members 14.

A fluid such as air is supplied to the fluid powered cylinders 30 through fluid conduits 42 for powering the cylinders to slidably move the flat slide plate member 16.

OPERATION

As shown in phantom line in FIG. 2, element 44 may constitute an existing flange on a vibrating dryer or other structure operable under vacuum or pressure. Also shown in phantom line is element 46 which is a flange secured on the opposite side of the sliding gate valve and to which a flexible boot 48 may be connected.

Figure 3:
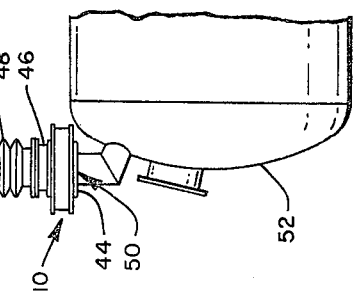
FIG. 3 is an elevational view reduced in size of a portion of a vibrating dryer illustrating where the automatic sliding gate valve may be connected.

In reference to FIG. 3, the automatic sliding gate valve 10 may be connected to the ingress opening 50 of the vibrating dryer 52. The egress opening (not shown) may be located at the bottom of the vibrating dryer 52.

In operation the operator or a suitably designed computer (not shown) may trigger a sequence, causing fluid such as air to flow through the various conduits, thus deflating the pneumatic seal members 24, activating the fluid powered cylinders 30 to move the flat slide plate member 16 to either the open or closed position and then reinflating the pneumatic seal members. In the opened position the opening 22 in the flat slide plate member is in coaxial alignment with the openings 20 in the outer plate members 14. In the closed position, the flat surface of the flat slide plate member 16 extends across the openings 20 in the outer plate members 14, as illustrated in FIG. 1. In either position the pneumatic seal members are expanded to seal against the flat slide plate member. When pellets or other comminuted materials are fed into the dryer 52 through the sliding gate valve when in the opened position, the expanded pneumatic seal members prevent pellets or other comminuted materials from passing beyond the seal and jamming the sliding mechanism of the sliding gate valve. Any pellets or comminuted materials falling into the mechanism from any other source are quickly shaken free from the mechanism through the longitudinally extending slots 32 during the vibrating action of the dryer.

In operating the sliding gate valve, it is not necessary to shut the vibrating dryer down when opening the sliding gate valve or closing same.

The pneumatic seal members, when inflated, serve to hold the flat slide plate rigidly in either the open or closed position, and when deflated, allow the flat slide plate to be moved to either position without causing any wear of the seal members. When the sliding gate valve is in the closed position, vacuum or pressure may be contained on either side or both sides of the valve as desired.

The sliding gate valve may be made of lightweight materials such as aluminum to resist fatigue of the dryer conduit openings from the vibration. It may also be fabricated from other materials such as steel, titanium or plastic to gain strength or reduce weight if necessary for other operations.

When the sliding gate valve is connected to the egress opening on the bottom of the dryer (not shown), the fluid powered cylinders will be located on the surface of the outer plate member opposite from the egress opening, as illustrated with respect to the ingress opening 42.

Due to the lightweight construction possible in addition to the fact that the design of the valve is such that there is an even radial distribution of the materials of construction for the valve about the centerline of flow through the valve, the valve will not apply significant bending movements to the conduits to which it is connected. On the other hand it is sufficiently rigid to withstand moderate continuous vibration of 4 G's or more acceleration.

The invention has been described in detail with particular reference to preferred embodiments thereof, but it will be understood that variations and modifications can be effected within the spirit and scope of the invention.

I claim:

1. An automatic sliding gate valve adapted to be connected to the ingress or egress opening of a vibrating dryer or other structure operable under either vacuum or pressure, said sliding gate valve comprising:

a pair of parallelly spaced apart side walls;

a pair of outer plate members connected in spaced apart parallel relation at right angles to and by said pair of parallelly spaced apart side walls, each outer plate member defining therethrough an opening of predetermined size in coaxial alignment and coalignment with the opening through the other outer plate member and adapted to be in coaxial alignment with said ingress or egress opening of said dryer or other structure when said gate valve is connected thereto;

a flat slide plate member;

said pair of parallelly spaced apart side walls having opposed slotted guide rails adapted to slidably receive therebetween the opposite side edges of said flat slide plate member;

said flat slide plate member defining therethrough adjacent one end thereof an opening of predetermined size adapted to be in coaxial alignment with said outer plate member openings when slidably moved thereto;

pneumatic seal means bordering each of said outer plate member openings on the side of each of said outer plate members that is adjacent to one of the flat surfaces of said flat slide plate member and adapted when expanded to provide an airtight seal between each of said outer plate members and the adjacent flat surfaces of said flat slide plate member and around each of said outer plate member openings;

means for expanding and contracting said pneumatic seal means; and means connected to said flat slide plate member and adapted to slidably move said flat slide plate member along said opposed slotted guide rails until the opening in said flat slide plate member is in said coaxial alignment with said outer plate member openings or the flat surface of said flat slide plate member extends over said latter openings, said means adapted to slidably move said flat slide plate member including a pair of fluid powered cylinders, each being operably connected adjacent one of said opposite side edges of said flat slide plate member on one side thereof, and each outer plate member defining through its opposite end portions along the length of the outer plate member a plurality of longitudinally extending slots each parallel to the others, and wherein each fluid powered cylinder is secured to the outer surface of one of said outer plate members and has means extending from one end of said fluid powered cylinder and through one of said longitudinally extending slots for said operable connection to said flat slide plate member.

2. An automatic sliding gate valve as defined in claim 1 wherein the opposite end portions of each outer plate member along the length thereof extend an equal distance from the axis of the opening in said outer plate member, and the flat slide plate member is supported and confined along its entire length for movement within said opposed slotted guide rails.

* * * * *